United States Patent [19]

Peche et al.

[11] 3,979,646

[45] Sept. 7, 1976

[54] SURGE VOLTAGE ARRESTER

[75] Inventors: Gerhard Peche; Gerhard Lange; Dieter Grueneberg, all of Berlin, Germany

[73] Assignee: Siemens Aktiengesellschaft, Berlin & Munich, Germany

[22] Filed: Oct. 9, 1974

[21] Appl. No.: 513,349

[30] Foreign Application Priority Data

June 28, 1974 Germany ............................ 2431236

[52] U.S. Cl. .................................... 317/62; 317/68; 313/306; 313/221; 313/308; 315/35

[51] Int. Cl.² ........................................... H02H 3/22

[58] Field of Search ................ 317/62, 61, 61.5, 70, 317/68; 313/54, 181, 208, 221, 306, 308, 325, DIG. 5, 218; 315/35

[56] References Cited

UNITED STATES PATENTS

| | | | |
|---|---|---|---|
| 2,449,113 | 9/1948 | Fruth | 313/54 |
| 2,495,274 | 1/1950 | Mayer | 313/54 |
| 2,564,040 | 8/1951 | Vance | 313/54 X |
| 2,682,619 | 6/1954 | Landrey | 313/54 |
| 3,209,197 | 9/1965 | Ahsmann et al. | 313/181 X |
| 3,388,278 | 6/1968 | Stutsman | 313/54 X |
| 3,431,452 | 3/1969 | Hale et al. | 317/61 X |
| 3,588,576 | 6/1971 | Kawiecki | 317/61 X |
| 3,691,428 | 9/1972 | Bahr et al. | 317/61 |
| 3,811,060 | 5/1974 | Tsujimoto | 313/54 X |

*Primary Examiner*—J D Miller
*Assistant Examiner*—Patrick R. Salce
*Attorney, Agent, or Firm*—Hill, Gross, Simpson, Van Santen, Steadman, Chiara & Simpson

[57] ABSTRACT

A surge voltage arrester having a gas-tight housing includes a pair of electrodes arranged at a distance opposite one another and with their active surfaces facing one another. The electrodes are inserted into respective ends of a tubular insulating body which carries at least one coating of electrically conductive material on the inner surface thereof extending over a portion of the tube length, the coating of electrically conductive material defines at least the envelope of a surface whose normal is approximately at right angles to the longitudinal axis of the surface voltage arrester. The coating of electrically conductive material may be punctiform circular, oval, triangular or polygonal. The coating may also be a semiconducting material, rather than a conductive material.

12 Claims, 6 Drawing Figures

SURGE VOLTAGE ARRESTER

BACKGROUND OF THE INVENTION

1. Field of the Invention

This invention relates to a surge voltage arrester having a gas-tight housing in which electrodes are arranged at a distance opposite one another and, facing one another with their active surfaces, are inserted into the ends of a tubular insulating body which carries at least one coating of electrically conductive material on the inner surface thereof, the coating extending over a part of the tube length of the insulating body.

2. Description of the Prior Art

In order to reduce the ignition voltage in surge voltage arresters, it is a well known practice to provide a coating of electrically conductive material on the tube-shaped insulating body of the surge voltage arrester. For example, reference may be taken to German Pat. No. 1,070,733. These gas-filled surge voltage arresters are basically composed of two electrodes which are fused, in a gas-tight fashion, to an interlying insulating body. The atmosphere in the discharge space is preferably composed of inert gases which do not react with the electrodes participating in the discharge.

The German published application No. 2,032,899 discloses surge voltage arresters in which, in order to reduce the ignition voltage, at least one coating of electrically conductive material is provided on the tube-shaped insulating body of the surge voltage arrester. This coating is in the form of a narrow strip which extends in the direction from one electrode to the other. Narrow strips of this type which facilitate the ignition of the gas discharge path through field distortion on the electrodes are therefore referred to as ignition strips. These ignition strips are arranged on the tube-shaped insulating body such that they are either electrically conductively connected to an electrode, or insulated from the electrodes.

These known surge voltage arresters have the disadvantage that the field electron yield produced by the ignition strips is low because the ignition strips are narrow and only weakly coupled to the electrodes and the asymmetry of the equipotential lines is low.

SUMMARY OF THE INVENTION

The object of the present invention is to provide surge voltage arresters in which both a large and uniform reduction of the impulse sparkover voltage is insured.

In order to realize the foregoing object in a surge voltage arrester of the type generally described above, the present invention proposes that the coating of electrically conductive material is at least the envelope of a surface whose normal is approximately at right angles to the longitudinal axis of the surge voltage arrester.

The coatings provided on the inside of the tube-shaped insulating body are expediently formed from conductive or semi-conducting material and their widths are approximately equal to the width of the active electrode surfaces in the region between such surfaces, i.e. in the region of the ionization zone. The ignition coating is preferably punctiform, circular, oval, triangular or polygonal.

A single coating or more than one coating may be used and, for example in the case of two coatings, these are galvanically contacted, in each case, to respective ones of the two electrodes. One or more than one layer can also be arranged on the inner surface of the insulating body, insulated from the electrodes. In comparison to the prior art, the essential advantage is gained that the wide, electrically conductive coatings, even those which have been applied in an insulated fashion to the inner surface of the surge voltage arrester, ensure a greater coupling of the coatings to the end electrodes and a greater asymmetry of the equipotential lines of the end electrodes. The field electron yield, which is produced by the electrically conductive coatings, increases substantially through these two measures so that a greater, and above all a more uniform, reduction of the impulse spark-over voltage is achieved than in the case of surge voltage arresters heretofore known.

According to the invention, the geometry of the electrically conductive coatings which serve to reduce the impulse sparkover voltage is, because of its greater effectiveness, also less sensitive to deviations in the manufacturing process than in the case of known surge voltage arresters. The local dependence of the composition of the coating will be considerably less critical in the event of a large spot than in the known thin ignition strip.

Employing liquid preparations to produce the coating, preferably as a suspension of graphite with glass solder powder, the entire interior is preferably filled with the coating material. It is also advantageous to mix a radioactive doping, preferably a promethium compound to the coating.

If the conductive coating is produced with the aid of writing implements, most expediently pencil leads containing graphite, which produce a conductive layer on the surface by graphite friction, is sufficient to draw the outlines of the proposed figures as a cohesive line on the inner surface of the insulating body. Also, when a graphite pencil lead is used, it can be expedient to dope this lead in radioactive fashion, for example with promethium 147. There are practically no differences in the effects of the hollowed and the filled surfaces of the electrically conductive coatings in respect of the reduction of the impulse sparkover voltage. In the case of the ignition coating which is drawn as a closed line on the inner surface of the insulating body, an insulating inner section remains free which becomes increasingly smaller in proportion to the increase in the thickness of the line until the surface is completely filled with the electrically conductive coating.

A surge voltage arrester constructed in accordance with the invention has proved particularly advantageous when equipped with an electrically conductive coating in the form of a spot of a mixture composed of a graphite suspension (Hydrocolloid) and a glass solder powder, the diameter of the spot being comparable to the dimensions of the electrode diameters. In this case, the coating is arranged in the middle of the insulating body, on its inner surface, insulated from the electrodes, and the distance of the electrodes from the insulating body is greater than or smaller than the distance between the two electrodes.

BRIEF DESCRIPTION OF THE DRAWING

Other objects, features and advantages of the invention, together with its organization, construction and operation will be best understood from the following detailed description taken in conjunction with the accompanying drawing, on which.

DESCRIPTION OF THE PREFERRED EMBODIMENTS

Figure 1:
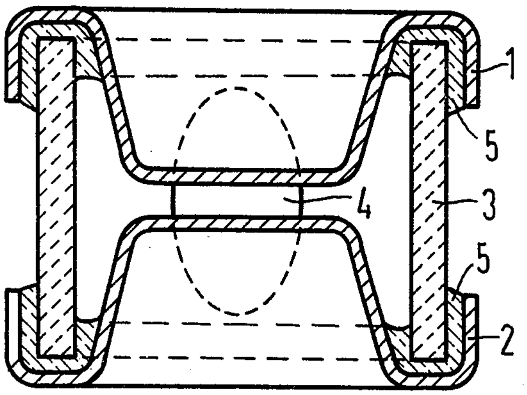
FIG. 1 is a simplified illustration of a longitudinal sectional view of a surge voltage arrester constructed in accordance with the invention.

In the surge voltage arrester illustrated in FIG. 1, two electrodes 1 and 2 are designed as frustum-shaped cups which are inserted and sealed in a gas-tight manner into respective ends of a tubular insulating body 3. The cups 1 and 2 have their active electrode surfaces disposed to face each other so as to define a gap therebetween.

The gas-tight joint between the electrodes 1 and 2 and the tubular insulating body 3 is effected, in this exemplary embodiment, via a glass inlay 5. The insulating body 3 consists of glass or ceramic, for example.

At least one coating 4 of electrically conductive material is arranged on the inner surface of the insulating body 3. In this exemplary embodiment, the coating 4 (or coatings) is insulated from the electrodes 1 and 2, and possesses the shape of an oval surface. In the event that the insulating body 3 consists of glass, it has proven advantageous to roughen the insulating body 3 by an etching process before the application of the coating (or coatings) 4. This procedure facilitates the application of the ignition coating 4 and also increases its adhesive strength, in particular if the ignition coating 4 is applied to the insulating body 3 by being rubbed off from a body consisting of a solid, electrically conductive, possibly radioactive-doped substance.

Figure 2:
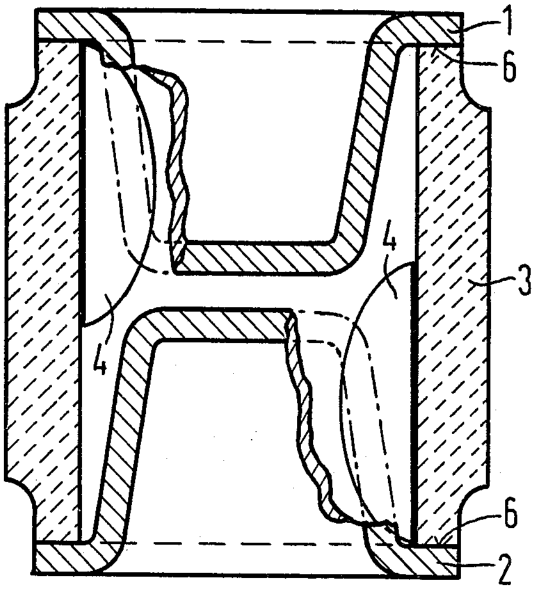
FIG. 2 is a longitudinal sectional view of a further embodiment of a surge voltage arrester constructed in accordance with the invention.

In the surge voltage arrester illustrated in FIG. 2, the electrodes 1 and 2 are again of frustum shape. The tubular insulating body 3, in this exemplary embodiment, is provided on the external surface thereof with a shoulder beyond which the outer sides of the electrodes 1 and 2 do not project. This type of shape of the surge voltage arrester has the advantage that the arrester can be installed in metallic holders in an electrically insulated fashion. The gas-tight connection of the insulating body 3 to the electrodes 1 and 2 is carried out in this exemplary embodiment via a metal-ceramic connector 6. In this exemplary embodiment, two circular coatings 4 are provided. These two circular coatings 4 are arranged on the inner surface of the insulating body 3 and are galvanically connected to respective ones of the electrodes 1 and 2. The contact with the electrodes 1 and 2 is established by way of the metallization of the metal-ceramic connection 6.

Figure 3:
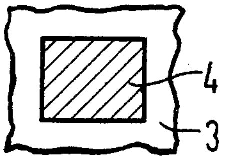
FIGS. 3–6 schematically illustrate various other forms of coatings, which coatings have been shaded for purpose of clarity.
Figure 4:
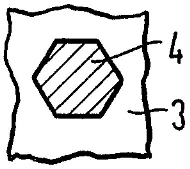
Figure 6:
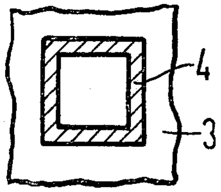
Figure 5:
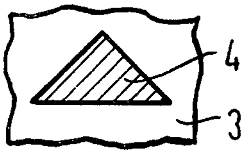

FIGS. 3–6 illustrate portions of further forms of electrically conductive coatings 4 which may be applied to the inner surface of the insulating body 3. In order to improve clarity in the drawings, the coatings 4 have been shaded. In FIG. 3, for example, the coating 4 has been shown in FIGS. 3–6 to define polygonal surfaces. More specifically, in FIG. 3 the coating 4 defines a rectangular surface; in FIG. 4 the coating 4 is illustrated as defining a hexagonal surface; in FIG. 5 the coating 4 is shown as defining a triangular surface; and in FIG. 6 the coating 4 is illustrated as defining the envelope of a rectangular surface.

The invention is not limited to the exemplary embodiments thereof represented on the drawing. The coatings 4 of electrically conductive material, according to the invention, can be used in all symmetrical surge voltage arresters whose ignition chambers comprise electrode end faces having a surrounding insulating body. Also, it is not necessary that the electrodes be of frustum shape; they can be, for example, cap-shaped or cylindrical.

Although we have described our invention by reference to the particular illustrative embodiments and modifications discussed above, many other changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a surge voltage arrester of the type having a gas-tight housing wherein a pair of discharge electrodes are arranged with their active electrode surfaces facing each other and spaced apart in a tubular insulating body, and at least one ignition electrode is carried by the insulating body over a portion of the length thereof, the improvement wherein:
   the ignition electrode is carried on the inner surface of the insulating body and defines at least the envelope of a surface which has a normal that is perpendicular to the longitudinal axis of the surge voltage arrester, said ignition electrode defining a puncti-form surface.

2. In a surge voltage arrester of the type having a gas-tight housing wherein a pair of discharge electrodes are arranged with their active electrode surfaces facing each other and spaced apart in a tubular insulating body, and at least one ignition electrode is carried by the insulating body over a portion of the length thereof, the improvement wherein:
   the ignition electrode is carried on the inner surface of the insulating body and defines at least the envelope of a surface which has a normal that is perpendicular to the longitudinal axis of the surge voltage arrester, said ignition electrode defining a circular surface.

3. In a surge voltage arrester of the type having a gas-tight housing wherein a pair of discharge electrodes are arranged with their active electrode surfaces facing each other and spaced apart in a tubular insulating body, and at least one ignition electrode is carried by the insulating body over a portion of the length thereof, the improvement wherein:
   the ignition electrode is carried on the inner surface of the insulating body and defines at least the envelope of a surface which has a normal that is perpendicular to the longitudinal axis of the surge voltage arrester, said ignition electrode defining an oval surface.

4. In a surge voltage arrester of the type having a gas-tight housing wherein a pair of discharge electrodes are arranged with their active electrode surfaces facing each other and spaced apart in a tubular insulating body, and at least one ignition electrode is carried by the insulating body over a portion of the length thereof, the improvement wherein:
   the ignition electrode is carried on the inner surface of the insulating body and defines at least the envelope of a surface which has a normal that is perpendicular to the longitudinal axis of the surge voltage arrester, said ignition electrode defining a polygonal surface.

5. The improved voltage arrester set forth in claim 4, wherein said ignition electrode defines a triangular polygonal surface.

6. The improved surge voltage arrester of claim 4, wherein said ignition electrode defines a rectangular polygonal surface.

7. In a surge voltage arrester of the type having a gas-tight housing wherein a pair of discharge electrodes are arranged with their active electrode surfaces facing each other and spaced apart in a tubular insulating body, and at least one ignition electrode is carried by the insulating body over a portion of the length thereof, the improvement wherein:

the ignition electrode is carried on the inner surface of the insulating body and defines at least the envelope of a surface which has a normal that is perpendicular to the longitudinal axis of the surge voltage arrester, the width of the ignition electrode in the region of the active surfaces of the discharge electrodes being approximately equal to the widths of the active surfaces.

8. In a surge voltage arrester of the type having a gas-tight housing wherein a pair of discharge electrodes are arranged with their active electrode surfaces facing each other and spaced apart in a tubular insulating body, and at least one ignition electrode is carried by the insulating body over a portion of the length thereof, the improvement wherein:

the ignition electrode is carried on the inner surface of the insulating body and defines at least the envelope of the surface which has a normal that is perpendicular to the longitudinal axis of the surge voltage arrester, said ignition electrode comprising a mixture including a graphite suspension and a glass solder powder.

9. The improved surge voltage arrester set forth in claim 8, wherein said mixture includes a radioactive dopant.

10. The improved surge voltage arrester set forth in claim 9, wherein said radioactive dopant comprises a radioactive promethium compound.

11. In a surge voltage arrester of the type having a gas-tight housing wherein a pair of discharge electrodes are arranged with their active electrode surfaces facing each other and spaced apart in a tubular insulating body, and at least one ignition electrode is carried by the insulating body over a portion of the length thereof, the improvement wherein:

the ignition electrode is carried on the inner surface of the insulating body and defines at least the envelope of a surface which has a normal that is perpendicular to the longitudinal axis of the surge voltage arrester, said ignition electrode comprising a graphite lead, said graphite lead containing radioactive doping.

12. In a surge voltage arrester of the type having a gas-tight housing wherein a pair of discharge electrodes are arranged with their active electrode surfaces facing each other and spaced apart in a tubular insulating body, and at least one ignition electrode is carried by the insulating body over a portion of the length thereof, the improvement wherein:

said tubular body consisting of glass, said tubular insulating body including a rough inner surface, and said ignition electrode carried on said rough inner surface and defining at least the envelope of a surface which has a normal that is perpendicular to the longitudinal axis of the surge voltage arrester.

* * * * *